United States Patent
Wetzig

(10) Patent No.: US 11,143,571 B2
(45) Date of Patent: Oct. 12, 2021

(54) FILM CHAMBER HAVING DOUBLE FILM

(71) Applicant: INFICON GmbH, Köln (DE)

(72) Inventor: Daniel Wetzig, Cologne (DE)

(73) Assignee: INFICON GmbH, Cologne (DE)

( * ) Notice: Subject to any disclaimer, the term of this patent is extended or adjusted under 35 U.S.C. 154(b) by 131 days.

(21) Appl. No.: 16/476,820

(22) PCT Filed: Jan. 17, 2018

(86) PCT No.: PCT/EP2018/051116
§ 371 (c)(1),
(2) Date: Jul. 9, 2019

(87) PCT Pub. No.: WO2018/134258
PCT Pub. Date: Jul. 26, 2018

(65) Prior Publication Data
US 2019/0376872 A1    Dec. 12, 2019

(30) Foreign Application Priority Data
Jan. 23, 2017 (DE) .......................... 102017201004.5

(51) Int. Cl.
*G01M 3/32* (2006.01)
(52) U.S. Cl.
CPC ................................. *G01M 3/3281* (2013.01)
(58) Field of Classification Search
CPC .. G01M 3/3218; G01M 3/3281; G01M 3/229; G01M 3/329; G01M 3/227; G01M 3/26; G01M 3/02; G01M 3/32
See application file for complete search history.

(56) References Cited

U.S. PATENT DOCUMENTS

| | | | | |
|---|---|---|---|---|
| 3,027,753 A | * | 4/1962 | Harder, Jr. ............ | G01M 3/229 73/40.7 |
| 4,584,877 A | * | 4/1986 | Brayman .............. | G01M 3/229 73/40.7 |
| 4,593,554 A | * | 6/1986 | Aarts .................... | G01M 3/329 73/45.4 |
| 4,689,987 A | * | 9/1987 | Aarts .................... | G01M 3/329 73/49.3 |
| 4,951,496 A | * | 8/1990 | Aarts .................. | G01M 3/3218 73/49.3 |

(Continued)

FOREIGN PATENT DOCUMENTS

| | | |
|---|---|---|
| DE | 19642099 | 4/1998 |
| DE | 102014218399 | 3/2016 |

(Continued)

*Primary Examiner* — David A. Rogers
(74) *Attorney, Agent, or Firm* — Kirton & McConkie; Craig Metcalf

(57) ABSTRACT

The invention relates to a film chamber 10 which has a film chamber wall for testing the sealing tightness of a gas-filled test specimen 38, which film chamber wall defines a chamber volume 32 for holding the test specimen 38 and has a first vacuum connection 28 for evacuating the chamber volume 32 by means of a first vacuum pump 30 connected to the first vacuum connection 28, wherein at least a portion of the film chamber wall has a flexible film 12, 14, characterized in that the film 12, 14 has two layers 20, 22 arranged adjacent to each other which surround an evacuable film interspace 26.

5 Claims, 1 Drawing Sheet

(56) References Cited

U.S. PATENT DOCUMENTS

| | | | | |
|---|---|---|---|---|
| 5,513,516 A * | 5/1996 | Stauffer | G01M 3/3218 73/49.2 |
| 6,321,589 B1 * | 11/2001 | Regimand | G01N 9/02 383/42 |
| 6,354,142 B1 * | 3/2002 | Nothhelfer | G01M 3/227 73/40.7 |
| 6,732,571 B1 * | 5/2004 | Flosbach | G01M 3/20 340/605 |
| 6,854,318 B2 * | 2/2005 | Sagi | G01M 3/04 73/40 |
| 6,945,092 B2 * | 9/2005 | Widt | G01M 3/229 73/40.7 |
| 6,955,076 B1 * | 10/2005 | Widt | G01M 3/227 73/40.7 |
| 9,046,437 B2 * | 6/2015 | Miller | G01M 3/04 |
| 9,784,639 B2 * | 10/2017 | Wetzig | G01M 3/3281 |
| 9,810,600 B2 * | 11/2017 | Wetzig | G01M 3/36 |
| 9,927,321 B2 * | 3/2018 | Decker | G01M 3/3281 |
| 10,119,883 B2 * | 11/2018 | van Triest | G01M 3/3281 |
| 10,247,637 B2 * | 4/2019 | Wetzig | G01M 3/3281 |
| 10,309,862 B2 * | 6/2019 | Decker | G01M 3/3218 |
| 10,401,251 B2 * | 9/2019 | Van Triest | G01M 3/3218 |
| 10,670,489 B2 * | 6/2020 | Decker | G01M 3/3281 |
| 10,844,877 B2 * | 11/2020 | Decker | G01M 3/229 |
| 10,845,266 B2 * | 11/2020 | Decker | G01M 3/205 |
| 10,852,212 B2 * | 12/2020 | Wetzig | G01M 3/363 |
| 2003/0233866 A1 * | 12/2003 | Widt | G01M 3/229 73/40 |
| 2010/0170326 A1 * | 7/2010 | Miller | G01M 3/227 73/49.3 |
| 2014/0311222 A1 * | 10/2014 | Decker | G01M 3/3218 73/40 |
| 2014/0326051 A1 * | 11/2014 | Wetzig | G01M 3/3281 73/40 |
| 2015/0241298 A1 * | 8/2015 | Decker | G01M 3/3281 73/40 |
| 2017/0095984 A1 * | 4/2017 | Anderson | B29C 35/0288 |
| 2018/0149553 A1 * | 5/2018 | Wetzig | G01M 3/3281 |

FOREIGN PATENT DOCUMENTS

| | | |
|---|---|---|
| EP | 0741288 | 8/2002 |
| JP | S-5885129 A1 * | 5/1983 |
| WO | 2015/140042 | 9/2015 |

* cited by examiner

FILM CHAMBER HAVING DOUBLE FILM

RELATED APPLICATIONS

This application is a National Stage of International Application No. PCT/EP2018/051116, filed Jan. 17, 2018, and entitled FILM CHAMBER HAVING DOUBLE FILM, which claims the benefit of DE 10 2017 201 004.5, filed Jan. 23, 2017. This application claims priority to and incorporates herein by reference the above-referenced applications in their entirety.

BACKGROUND OF THE INVENTION

The invention relates to a film chamber for leakage detection of a gas-filled test specimen, such as a food package, for example.

Such film chambers comprise a chamber volume defined by a film chamber wall, into which chamber volume the test specimen is introduced for leakage detection. The film chamber is provided with a first vacuum connection to which a vacuum pump for evacuating the chamber volume is connected. At least a portion of the film chamber wall is configured as a flexible film which is capable of clinging to the outer shape of the test specimen during evacuation.

Such a film chamber is used in the leak detector INFICON® Contura® S400, for example. In this apparatus, the pressure increase method is applied for measuring a leakage rate of a test specimen, such as a packaging bag, for example. The film chamber is evacuated via the first vacuum connection such that gas contained in the test specimen flows into the chamber volume if a leak exists. Thus the pressure in the chamber volume in the area outside the test specimen increases over time. This pressure increase is measured and serves as an indication of a possible leak. The accuracy and/or the detection limit of the pressure increase method depends on the net chamber volume, that is on the chamber volume in the area outside the test specimen chamber volume minus the test specimen volume. The smaller this chamber volume, the larger the pressure increase over time at a given leak rate.

The film chamber of the leak detector INFICON® Contura® S400 clings to the test specimen during evacuation such that the net chamber volume is particularly small. Another function of the film is that atmospheric pressure acts upon the test specimen from outside the film chamber such that the chamber volume that is the space between the films and the test specimen can be evacuated without the test specimen bursting. When the difference between the pressure inside the test specimen and the pressure inside the film chamber and outside the test specimen increases, the gas leak rate increases when leakages exist such that the leak detection is improved.

In a film chamber such as that of Contura® S400, for example, the smallest detectable leak rate of a test specimen is typically limited by the effect of a pressure increase inside the film chamber, which is measured on a tight test specimen and in an empty film chamber. This pressure increase is caused by gases which desorb from the film of the film chamber or diffuse through the film. These are gases which are dissolved in the film and, in a vacuum, are removed from the film or permeate through the film.

The selection of usable film materials for a film chamber is limited by this effect. Further, an adequate thickness of the film must be selected for creating an adequate diffusion barrier. Due to its thickness, the film should adequately prevent gases from diffusing through the film thus causing a pressure increase inside the evacuated film chamber. Further, the film material used must allow for only a low solubility of gas components of air in order to limit outgassing. Therefore, the film of a film chamber cannot be made as flexible as desired for enclosing the test specimen as tightly and gently as possible. The quality of the film is reduced with increasing thickness. Highly flexible materials, such as silicone films, for example, which are capable of clinging particularly well and tightly to a test specimen, have a high permeability and allow for a high solubility of gases, thus considerably reducing the detection limit of a leak. Therefore, such films are not used for conventional film chambers.

It is an object of the invention to provide an improved film chamber having an improved detection limit, in particular when the pressure increase method is applied.

The film chamber according to the invention is defined by the features of claim 1.

According to the invention, a film of the film chamber wall comprises at least two layers arranged adjacent to each other which define an evacuable film interspace between them. When the film interspace is evacuated, the gas fractions dissolved out of the film by desorption or passing through the film by diffusion are sucked into the film interspace and do not enter the chamber volume. Thus these gas fractions do not influence the pressure increase in the chamber volume. The two film layers placed one upon the other are sealed towards the edge and provided with a vacuum connection for evacuating the film interspace. The thin film interspace defined between the film layers is permanently evacuated during operation of the film chamber for the purpose of leakage detection on a test specimen. For this purpose, a vacuum pump is connected to the gas connection vacuum connection which is connected to the film interspace. The permeation rate of gas fractions entering the chamber volume even in the case of a tight test specimen or when no test specimen is present in the film chamber is thus reduced by more than two orders of magnitude to a negligible value.

Preferably, between the two film layers a gas-permeable material, for example a nonwoven fabric, separating the two layers from each other is arranged. The gas-permeable material allows for an improved evacuation of the film interspace even when the film layers are closely placed one upon the other.

Preferably, the films of the film chamber walls each comprise two layers between which an evacuable film interspace is defined. In the edge area of the films the two film layers are held by a frame and connected thereto in a gastight manner. The frame/frames may comprise or constitute the first and/or the second vacuum connection.

According to the invention, a corresponding method for leak detection on a test specimen accommodated in a film chamber of the type described above is further claimed. The chamber volume in the area outside the test specimen is evacuated via the first vacuum connection. Further, the film interspace is preferably evacuated via the second vacuum connection. The leakage detection is performed by means of the pressure increase method, wherein the pressure inside the film chamber is measured over time in the area outside the test specimen. An increase of the pressure serves as an indication of a leak.

First, the chamber volume is set to a vacuum pressure and the film chamber is not continued to be evacuated when this vacuum pressure has been reached. When the predetermined vacuum pressure has been reached, the pressure increase is measured over time. During the measurement of the pressure increase, the film interspace of each film made up of two layers is preferably permanently and continuously evacuated.

BRIEF DESCRIPTION OF THE DRAWINGS

Hereunder an exemplary embodiment of the invention is explained in detail with reference to the accompanying drawing in which.

DETAILED DESCRIPTION OF THE INVENTION

Figure 1:
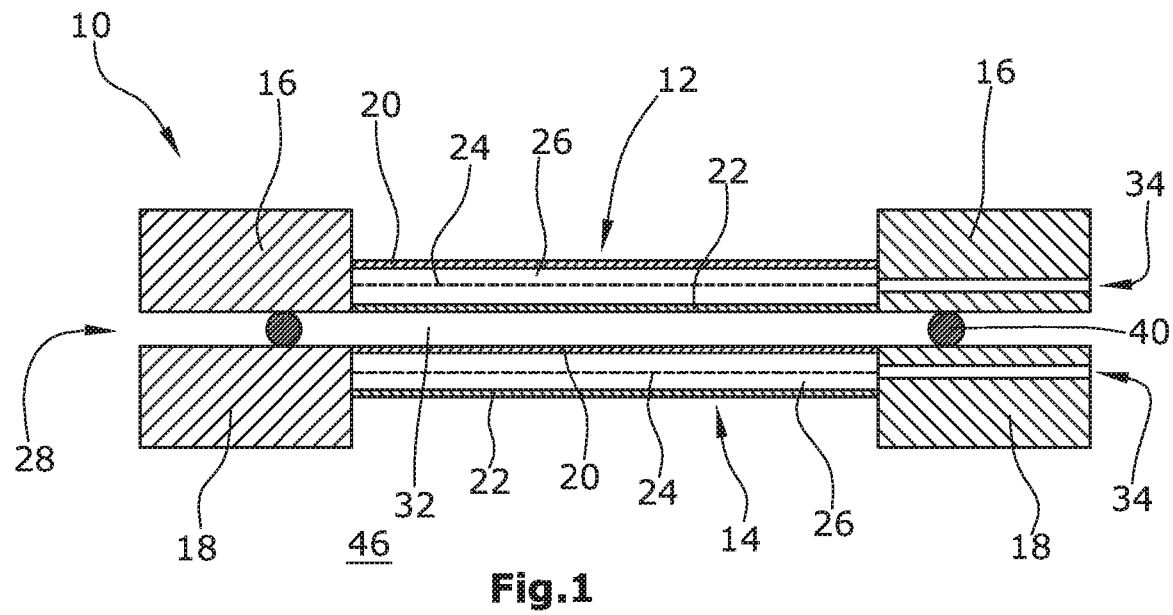
FIG. 1 shows a sectional view of the film chamber in an empty condition.

The film chamber 10 is made up of two flexible films 12, 14 whose edge areas are respectively mounted in a gastight manner in a frame 16, 18. The two films 12, 14 are each circular, and each frame 16, 18 is configured as a circular ring. Other shapes are conceivable.

Each of the two films 12, 14 is made up of two layers 20, 22 between which a layer of a gastight material 24 in the form of a nonwoven fabric is arranged. The upper layer 20, the gastight material 24 and the lower layer 22 of each film 12, 14 are arranged in parallel to each other and close to each other. Between the upper film layer 20 and the lower film layer 22 of each film 12, 14 an evacuable film interspace 26 is defined where the gas-permeable nonwoven material 24 is arranged.

The two layers 20, 22 of each film 12, 14 are fixedly mounted in the same frame 16 and 18, respectively.

Between the two frames 16, 18 a first vacuum connection 28 for connecting a first vacuum pump 30 evacuating the chamber volume 32 defined between the adjacent films 12, 14 is provided.

In addition, each frame 16, 18 comprises a second vacuum connection 34 for connecting a second vacuum pump 36 which evacuates the film interspace 26 of the respective film 12, 14.

Figure 2:
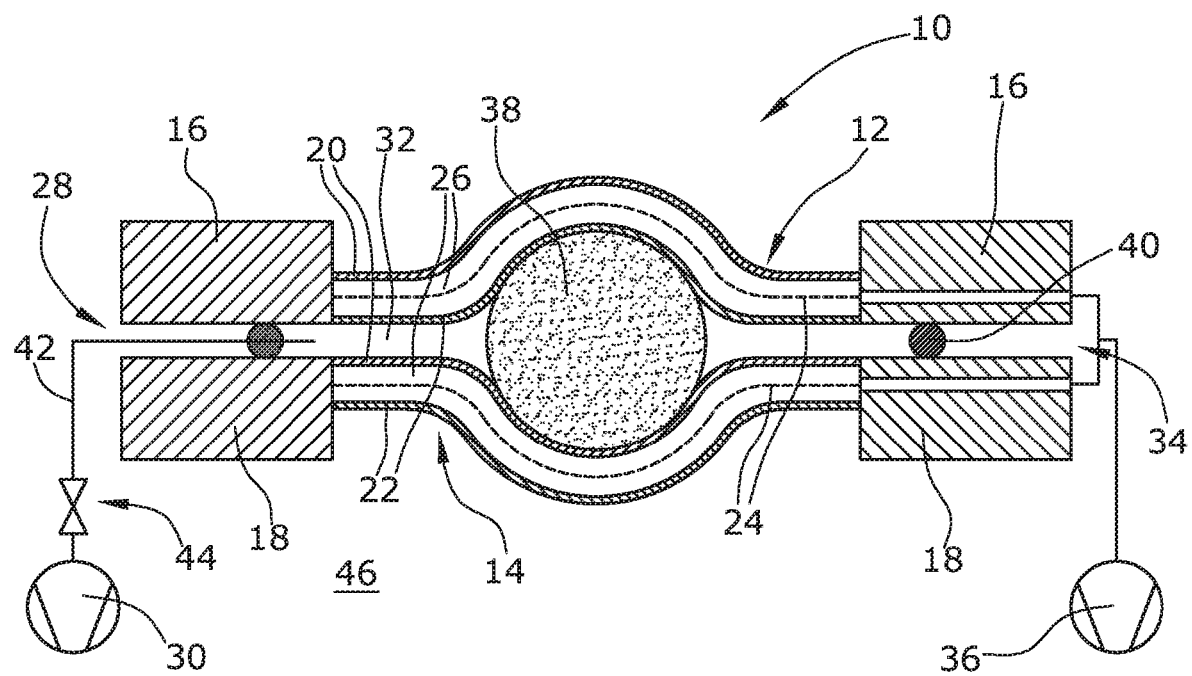
FIG. 2 shows the sectional view of FIG. 1 with the test specimen accommodated in the film chamber.

In FIG. 2 a test specimen 38 in the form of a gas-filled food package is placed into the chamber volume 32. The film chamber 10 is closed in a gastight manner. Between the two frames 16, 18 a sealing ring 40 prevents gas from entering the evacuated film chamber 10. With the aid of the first vacuum pump 30 the film chamber 10 is evacuated in the area outside the test specimen via the first vacuum connection 28 down to a predetermined vacuum pressure. The two films 12, 14 flexibly cling to the outer shape of the test specimen thus reducing the chamber volume 32. A valve 44 disposed in a gas line 42 connecting the first vacuum pump 30 and the first vacuum connection 28 is closed. The chamber volume 32 is hermetically sealed towards the atmosphere 46 surrounding the film chamber from the outside.

By means of a pressure sensor not illustrated in the Figures, the pressure inside the chamber volume 32 is measured and recorded over time. An increase of this pressure may serve as an indication of a leak in the test specimen 38 when an appropriate limit value for the pressure increase has been exceeded. This limit value may be set smaller than that of the conventional film chambers in that during the pressure measurement the pressure in the two film interspaces 26 is kept below an appropriate limit value of the vacuum pressure. This is realized by permanently evacuating the two film interspaces 26 via the two second vacuum connection 34 with the aid of the second vacuum pump 36. Gas escaping from the film layers 20, 22 and in particular from the two inner film layers 22—either in the form of gas desorbing from the film layers or gas diffusing through the film layers—is sucked into the film interspaces 26 due to the vacuum pressure in the film interspaces 26 and evacuated by means of the second vacuum pump 36. Preferably, at least during the pressure measurement the vacuum pressure in the two film interspaces 26 is lower than the pressure inside the chamber volume 32 such that desorbing or diffusing gas fractions are not fed into the chamber volume 32 but into the film interspaces 26.

The invention claimed is:

1. A film chamber comprising a film chamber wall provided for a tightness test on a gas-filled test specimen, said film chamber wall defining a chamber volume for accommodating said test specimen and being provided with a first vacuum connection for evacuating said chamber volume by means of a first vacuum pump connected to said first vacuum connection, wherein at least a portion of the film chamber wall comprises a flexible film and wherein said film comprises two layers arranged adjacent to each other and surrounding an evacuable film interspace, wherein a second vacuum connection is provided to which a second vacuum pump is connected for evacuating the film interspace, wherein the film chamber comprises two adjacent films between which the chamber volume is defined and which are respectively made up of two adjacent layers having respective film interspaces arranged between said two layers.

2. The film chamber according to claim 1, wherein in the film interspace a gas-permeable material separating the two layers from each other is arranged.

3. The film chamber according to claim 2, wherein the gas-permeable material is a nonwoven fabric.

4. The film chamber according to claim 1, wherein the outer edge area of each film is provided with a frame holding said film and being sealingly connected with said film, wherein said two frames constitute or comprise the first and/or the second vacuum connection.

5. A method for leakage detection on a test specimen using a film chamber according to claim 1, comprising the steps of:

introducing said test specimen into the chamber volume, closing said chamber volume, evacuating said chamber volume down to a predetermined vacuum pressure below atmospheric pressure, measuring over time the pressure inside said film chamber in the area outside said test specimen, detecting an increase of the measured pressure, and evacuating at least one, and preferable each film interspace during the leakage detection, wherein the film interspace is permanently kept below a limit vacuum pressure during the pressure measurement.

* * * * *